(12) United States Patent
Wang et al.

(10) Patent No.: US 12,471,826 B2
(45) Date of Patent: Nov. 18, 2025

(54) METHOD AND APPARATUS FOR ASSESSING A PHYSIOLOGICAL SIGNAL QUALITY BASED ON AN IABP DEVICE

(71) Applicant: ANHUI TONGLING BIONICS TECHNOLOGY CO., LTD, Hefei (CN)

(72) Inventors: Ping Wang, Hefei (CN); Yao Xie, Hefei (CN)

(73) Assignee: ANHUI TONGLING BIONICS TECHNOLOGY CO., LTD, Hefei (CN)

( * ) Notice: Subject to any disclaimer, the term of this patent is extended or adjusted under 35 U.S.C. 154(b) by 244 days.

(21) Appl. No.: 18/530,654

(22) Filed: Dec. 6, 2023

(65) Prior Publication Data

US 2024/0285218 A1    Aug. 29, 2024

(30) Foreign Application Priority Data

Feb. 27, 2023  (CN) .......................... 202310167725.9

(51) Int. Cl.
*A61B 5/352* (2021.01)
*A61B 5/00* (2006.01)
(Continued)

(52) U.S. Cl.
CPC ................ *A61B 5/352* (2021.01); *A61B 5/35* (2021.01); *A61B 5/721* (2013.01); *A61B 5/7257* (2013.01);
(Continued)

(58) Field of Classification Search
None
See application file for complete search history.

(56) References Cited

U.S. PATENT DOCUMENTS

| 8,066,628 B1 | 11/2011 | Jeevanandam et al. |
| 2022/0015643 A1* | 1/2022 | Rajbhandary ............ G01K 1/14 |

(Continued)

FOREIGN PATENT DOCUMENTS

| CN | 104688219 A | 6/2015 |
| CN | 105725966 A | 7/2016 |

(Continued)

*Primary Examiner* — Ankit D Tejani
(74) *Attorney, Agent, or Firm* — The Sun IP Law (57) ABSTRACT

The present disclosure provides a method and an apparatus for assessing a physiological signal quality based on an IABP device, and relates to the technical field of medical instruments. The method includes: acquiring, in the operation process of an IABP device, physiological signal of a patient treated by the IABP device, where the physiological signal include an electrocardiographic signal and/or an arterial blood pressure signal; extracting signal parameter values of the physiological signal, where the signal parameter values include: a first kurtosis, a skewness, an effective signal ratio, a second kurtosis, and a dominant frequency; performing signal quality assessment on the physiological signal based on the signal parameter values; and implementing, based on the physiological signal, intra-aortic balloon counterpulsation in response to a signal quality assessment result represents that the signal quality of the physiological signal satisfies a preset signal quality requirement.

16 Claims, 4 Drawing Sheets

(51) Int. Cl.
 *A61B 5/35* (2021.01)
 *A61M 60/139* (2021.01)
(52) U.S. Cl.
 CPC .......... *A61B 5/7264* (2013.01); *A61B 5/7282* (2013.01); *A61M 60/139* (2021.01)

(56) References Cited

U.S. PATENT DOCUMENTS

2022/0151565 A1   5/2022  Soeseno et al.
2023/0057740 A1*  2/2023  Montanari ........... A61B 5/7235

FOREIGN PATENT DOCUMENTS

| | | |
|---|---|---|
| CN | 110448748 A | 11/2019 |
| CN | 112869752 A | 6/2021 |
| CN | 115486849 A | 12/2022 |

\* cited by examiner

Fig. 4

METHOD AND APPARATUS FOR ASSESSING A PHYSIOLOGICAL SIGNAL QUALITY BASED ON AN IABP DEVICE

TECHNICAL FIELD

The present disclosure relates to the technical field of medical instruments, in particular to a method and an apparatus for assessing a physiological signal quality based on an IABP device.

BACKGROUND

The intra-aortic balloon counterpulsation (IABP) technology is an adjunctive support method used to support the cardiac function of patients and improve hemodynamics of the patients, and has been widely applied in the surgery and treatment processes of the patients in cardiology and cardiovascular surgery departments of hospitals. The principle of the IABP technology is as follows: an IABP device acquires physiological signal of the patient, determines the diastolic time and the systolic time of the patient based on the physiological signal, and controls a balloon to deflate before the systolic time, thereby reducing the end-diastolic pressure in the aorta, decreasing the workload of the left ventricle, reducing the afterload, and minimizing myocardial oxygen consumption; and the IABP device controls the balloon to inflate before the diastolic time, thereby increasing the diastolic coronary perfusion pressure and enhancing myocardial oxygen supply.

However, when the signal quality of the physiological signals is low, for example, when the physiological signal is heavily contaminated by noise, the diastolic time and the systolic time identified based on the above physiological signal may deviate significantly from the actual diastolic time and systolic time, and as a result, it becomes challenging for the IABP device to accurately achieve the above functions. Therefore, in the process of utilizing the IABP technology for patient treatment, there is an urgent need for a physiological signal quality assessment scheme.

SUMMARY

An objective of embodiments of the present disclosure is to provide an IABP-based physiological signal quality assessment method and device, thereby implementing quality assessment on physiological signal in the process of treating a patient by the IABP technology. Specific technical solutions are as follows:

According to a first aspect, an embodiment of the present disclosure provides an IABP-based physiological signal quality assessment method. The method includes:
acquiring, in an operation process of an IABP device, a physiological signal of the patient treated by the IABP device, where the physiological signal includes an electrocardiographic signal and/or an arterial blood pressure signal;
extracting signal parameter values of the physiological signal,
wherein the signal parameter values include: a first kurtosis, a skewness, an effective signal ratio, a second kurtosis, and a dominant frequency, the first kurtosis represents a steepness or a flatness of the physiological signal in a time domain distribution, the skewness represents a direction and a degree of deflection of the physiological signal in the time domain distribution, the effective signal ratio represents a ratio of an effective component relative to a total component in the physiological signal, the second kurtosis represents a steepness or a flatness of the physiological signal in a frequency domain distribution, and the dominant frequency represents a frequency corresponding to the second kurtosis of the physiological signal in the frequency domain distribution;
performing signal quality assessment on the physiological signal based on the signal parameter values;
in response to a signal quality assessment result represents that a signal quality of the physiological signal satisfies a preset signal quality requirement, implementing intra-aortic balloon counterpulsation based on the physiological signal.

In an embodiment of the present disclosure, performing signal quality assessment on the physiological signal based on the signal parameter values includes:
extracting a signal feature of the signal parameter values;
performing feature fusion on the extracted signal feature to obtain a target feature;
performing signal quality classification on the physiological signal based on the target feature to obtain the signal quality assessment result.

In an embodiment of the present disclosure, performing signal quality classification on the physiological signal based on the target feature includes:
inputting the target feature into a pre-trained support vector machine model to obtain a signal quality classification result output by the support vector machine model, which serves as the signal quality assessment result, where the support vector machine model is a model obtained by training, by adopting a support vector machine algorithm and a Gaussian radial basis function, an initial support vector machine model with signal parameter values of sample physiological signals as training samples and actual signal quality results of the sample physiological signals as training standards, and the support vector machine model is configured to perform signal quality classification on the physiological signal.

In an embodiment of the present disclosure, when the physiological signal is an electrocardiographic signal, the signal parameter values further include: the number of R waves in the electrocardiographic signal and a dispersion of RR intervals. The dispersion of RR intervals represents the dispersion of a time intervals between two adjacent R waves in the electrocardiographic signal. The effective signal ratio includes a first-category effective signal ratio and a second-category effective signal ratio.

In an embodiment of the present disclosure, performing signal quality assessment on the physiological signal based on the signal parameter values includes:
judging whether the dominant frequency is within a preset dominant frequency range, where the preset dominant frequency range is a normal dominant frequency range corresponding to a signal type of the physiological signal;
in response to the dominant frequency being within the preset dominant frequency range, determining a target quantity of signal parameter values, within preset target signal parameter ranges, from target signal parameter values, and performing signal quality assessment on the physiological signal based on the target quantity, where the target signal parameter values include the first kurtosis, the skewness, the effective signal ratio, and the second kurtosis; and the preset target signal parameter ranges area normal signal parameter value ranges corresponding to a signal type of the physiological signal.

In an embodiment of the present disclosure, performing signal quality assessment on the physiological signal based on the target quantity includes:

determining, from various preset quantity ranges, a target quantity range within which the target quantity falls, wherein the various preset quantity ranges correspond to preset signal quality grades;

adopting a preset signal quality grade corresponding to the target quantity range as the signal quality assessment result for the physiological signal.

According to a second aspect, an embodiment of the present disclosure provides an IABP-based physiological signal quality assessment apparatus. The apparatus includes:

a signal acquisition module, configured to acquire, in an operation process of an intra-aortic balloon counterpulsation (IABP) device, a physiological signal of a patient treated by the IABP device, where the physiological signal includes an electrocardiographic signal and/or an arterial blood pressure signal;

a data extraction module, configured to extract signal parameter values of the physiological signal, where the signal parameter values include a first kurtosis, a skewness, an effective signal ratio, a second kurtosis, and a dominant frequency, the first kurtosis represents a steepness or a flatness of physiological signal in a time domain distribution, the skewness represents a direction and a degree of deflection of the physiological signal in the time domain distribution, the effective signal ratio represents a ratio of an effective component relative to a total component in the physiological signal, the second kurtosis represents a steepness or a flatness of physiological signal in a frequency domain distribution, and the dominant frequency represents a frequency corresponding to the second kurtosis of the physiological signal in the frequency domain distribution;

a signal quality assessment module, configured to perform signal quality assessment on the physiological signal based on the signal parameter values; and a balloon counterpulsation module, configured to implement, based on the physiological signal, intra-aortic balloon counterpulsation in response to a signal quality assessment result represents that a signal quality of the physiological signal satisfies a preset signal quality requirement.

In an embodiment of the present disclosure, the signal quality assessment module includes:

a feature extraction sub-module, configured to extract a signal feature of the signal parameter values;

a feature fusion sub-module, configured to perform feature fusion on the extracted signal feature to obtain a target feature;

a first signal quality assessment sub-module, configured to perform signal quality classification on the physiological signal based on the target feature to obtain the signal quality assessment result.

In an embodiment of the present disclosure, the first signal quality assessment sub-module is configured to input the target feature into a pre-trained support vector machine model to obtain a signal quality classification result output by the support vector machine model, which serves as the signal quality assessment result, where the support vector machine model is a model obtained by training, by adopting a support vector machine algorithm and a Gaussian radial basis function, an initial support vector machine model with signal parameter values of sample physiological signals as training samples and actual signal quality results of the sample physiological signals as training standards, and the support vector machine model is configured to perform signal quality classification on the physiological signal.

In an embodiment of the present disclosure, when the physiological signal is electrocardiographic signal, the signal parameter values further include: the number of R waves in the electrocardiographic signal and a dispersion of RR intervals. The dispersion of RR intervals represents the dispersion of a time intervals between two adjacent R waves in the electrocardiographic signal. The effective signal ratio includes a first-category effective signal ratio and a second-category effective signal ratio.

In an embodiment of the present disclosure, the signal quality assessment module includes:

an information judgment sub-module, configured to judge whether the dominant frequency is within a preset dominant frequency range, and in response to the dominant frequency being within the preset dominant frequency range, trigger a second signal quality assessment sub-module, where the preset dominant frequency range is a normal dominant frequency range corresponding to a signal type of the physiological signal;

the second signal quality assessment sub-module, configured to determine a target quantity of signal parameter values, within preset target signal parameter ranges, from target signal parameter values, and perform signal quality assessment on the physiological signal based on the target quantity, where the target signal parameter values include the first kurtosis, the skewness, the effective signal ratio, and the second kurtosis; and the preset target signal parameter ranges are normal signal parameter value ranges corresponding to the signal type of the physiological signal.

In an embodiment of the present disclosure, the second signal quality assessment sub-module is configured to determine, from various preset quantity ranges, a target quantity range within which the target quantity falls, wherein the various preset quantity ranges correspond to preset signal quality grades, and a preset signal quality grade corresponding to the target quantity range is adopted as a signal quality assessment result for the physiological signal.

According to a third aspect, an embodiment of the present disclosure provides an electronic device, including a processor, a communication interface, a memory, and a communication bus, where the processor, the communication interface, and the memory are in communication through the communication bus;

the memory is configured to store a computer program; and the processor is configured to implement the method steps in the first aspect when executing the program stored in the memory.

According to a fourth aspect, an embodiment of the present disclosure provides a computer-readable storage medium. The computer-readable storage medium stores a computer program. The computer program, when executed by a processor, implements the method steps in the first aspect.

From the above, it can be seen that when the solution provided by this embodiment of the present disclosure is applied to quality assessment on the physiological signal, because the signal parameter values include the first kurtosis, the skewness, the effective signal ratio, the second kurtosis, and the dominant frequency, the first kurtosis and the skewness can serve as criteria for judging outliers in the physiological signal, the effective signal ratio can reflect, to some extent, the ratio of useful non-noise components relative to the total component in the physiological signal, the dominant frequency can reflect whether the physiological signal meet the signal quality standard, and the kurtosis can reflect noise distribution of the physiological signal, by integrating the above-mentioned parameter values and considering signal quality information represented by the signal parameter values, a more accurate and comprehensive signal quality assessment on the physiological signal can be performed.

Certainly, any product or method for implementing the present disclosure is not necessarily required to simultaneously achieve all of the advantages described above.

BRIEF DESCRIPTION OF THE DRAWINGS

In order to describe methods in embodiments of the present disclosure or in the prior art more clearly, drawings required to be used in descriptions of the embodiments or the prior art will be briefly introduced below, it is apparent that the drawings described below are only some embodiments of the present application, and those of ordinary skill in the art can obtain other embodiments according to these drawings.

DETAILED DESCRIPTION OF THE EMBODIMENTS

The methods in the embodiments of the present disclosure will be clearly and completely described below in conjunction with the drawings in the embodiments of the present disclosure, and it is apparent that the described embodiments are only a part rather all of embodiments of the present disclosure. Based on the embodiments of the present disclosure, all other embodiments obtained by those of ordinary skill based on the present application shall fall within the scope of protection of the present disclosure.

Firstly, before descriptions of the methods provided by the embodiments of the present disclosure, the executive body and application scenario of the embodiments of the present disclosure are described.

The application scenario for the embodiments of the present disclosure is the use of the IABP technology for patient treatment.

The executive body of the embodiments of the present disclosure is a control device for IABP. The control device is configured to collect physiological signal of a patient and operation parameter data of the IABP device, and makes a balloon inflate and deflate.

The methods provided by the embodiments of the present disclosure are described below.

Figure 1:
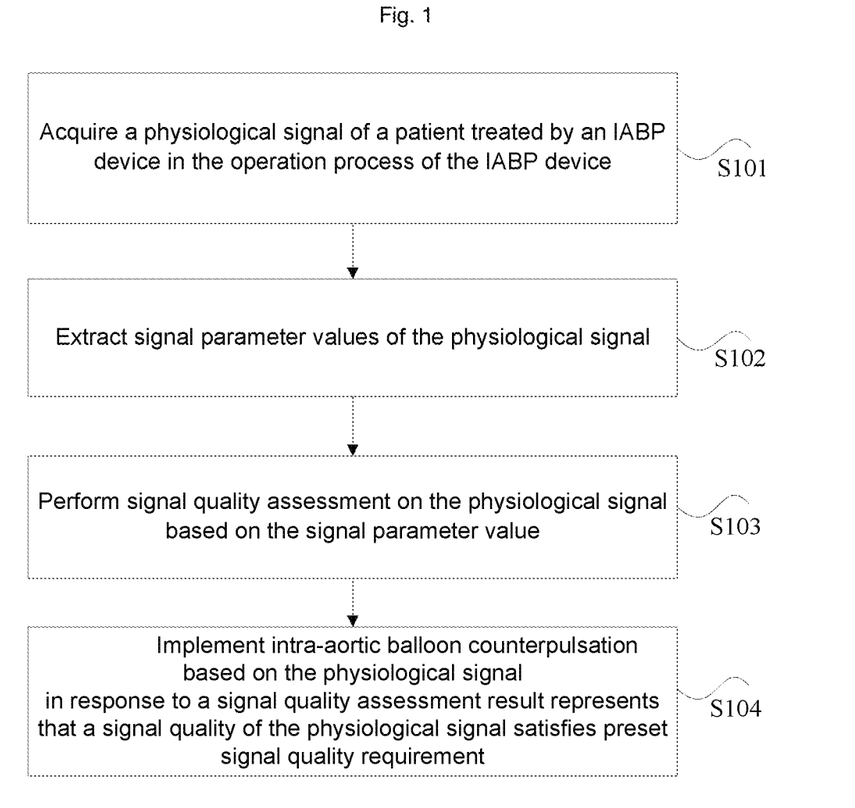
FIG. 1 is a schematic flowchart of a method for assessing a physiological signal quality based on an IABP device according to an embodiment of the present disclosure.

Referring to FIG. 1, FIG. 1 is a schematic flowchart of a method for assessing a physiological signal quality based on an Intra-Aortic Balloon counterPulsation (IABP) device according to an embodiment of the present disclosure. The method includes the following steps S101 to S104.

At step S101: acquire a physiological signal of a patient treated by an IABP device in an operation process of the IABP device.

The physiological signal includes an electrocardiographic signal and/or an arterial blood pressure signal. The physiological signal may be collected by a signal acquisition device in the IABP device. During a process of collecting the physiological signal, the signal sampling rate of the signal acquisition device can be preset. The signal acquisition device then collects the physiological signal based on the signal sampling rate.

After the physiological signal is acquired, the physiological signal can be segmented. The segmented physiological signal is subjected to quality assessment, thereby improving the efficiency of signal quality assessment. During the segmentation process, segmentation may be performed using a time window of 10 seconds, thereby obtaining multiple non-overlapping signal segments with the duration of 10 seconds.

At step S102: extract signal parameter values of the physiological signal.

The signal parameter values include a first kurtosis, a skewness, an effective signal ratio, a second kurtosis, and a dominant frequency. The first kurtosis represents a steepness or a flatness of physiological signal in the time domain distribution. The skewness represents a direction and a degree of deflection of the physiological signal in the time domain distribution. The effective signal ratio represents the ratio of an effective component in the physiological signal relative to a total component. The second kurtosis represents a steepness or a flatness of physiological signal in the frequency domain distribution, and can measure the sharpness of peaks of the physiological signal. The dominant frequency represents a frequency corresponding to the second kurtosis of the physiological signal in the frequency domain distribution, and can reflect the most prominent frequency component of the physiological signal.

To extract the signal parameter values, corresponding signal parameter value calculation algorithms can be adopted to extract the signal parameter values of the physiological signal.

Methods for calculating the above parameter values are respectively described below:

1. First Kurtosis and Skewness

The first kurtosis K and the skewness S are calculated based on following calculation formulas:

$$K = \frac{1}{n-1} \sum_{i=1}^{n} \frac{(x_i - \overline{x})^4}{SD^4} - 3 \quad S = \frac{1}{n-1} \sum_{i=1}^{n} \frac{(x_i - \overline{x})^3}{SD^3}$$

wherein n denotes the length of the signal, i denotes an identifier of signal data contained in the signal, $X_i$ denotes a signal value of the signal data with the identifier i, $\overline{X}$ denotes a mean value of the signal data contained in the signal, and SD denotes a variance of the signal data contained in the signal.

Taking the physiological signal being an electrocardiographic signal as an example, $X_i$ denotes a voltage value of signal data identified as i in the electrocardiographic signal, $\overline{X}$ denotes a mean voltage value of the signal data contained in the signal, and SD denotes the voltage variance of the signal data contained in the signal. Taking the physiological signal being arterial blood pressure signal as an example, $X_i$ denotes a blood pressure value of signal data identified as i in the arterial blood pressure signal, $\overline{X}$ denotes a mean blood pressure value of the signal data contained in the signal, and SD denotes the blood pressure variance of the signal data contained in the signal.

2. Effective Signal Ratio, Second Kurtosis, and Dominant Frequency

The physiological signal is subjected to fast Fourier transform (FFT) to obtain power spectral density (PSD) of the physiological signal, where FFT can realize the transformation of the physiological signal from the time domain to the frequency domain, and by using the PSD, deeper-level information of the physiological signal can be obtained.

Based on the PSD, the effective signal ratio is calculated based on the following expression:

$$SDR = \frac{\int_a^b PSD}{\int_c^d PSD}$$

wherein SDR denotes the effective signal ratio, a~b denotes a first preset frequency range, a is the minimum frequency within the first preset frequency range, and b is the maximum frequency within the first preset frequency range; c~d denotes a second preset frequency range, c denotes the minimum frequency within the second preset frequency range, and d denotes the maximum frequency within the second preset frequency range; and $\int_a^b PSD$ denotes the energy in the PSD within the first preset frequency range, and $\int_c^d PSD$ denotes the energy in the PSD within the second preset frequency range.

The first preset frequency range and the second preset frequency range are predetermined. In an embodiment, frequency ranges corresponding to the signal types of the physiological signal can be predetermined. For example, when the physiological signal is the electrocardiographic signal, the first preset frequency range may be 0.5 Hz to 15 Hz, and the second preset frequency range may be 0.05 Hz to 50 Hz. When the physiological signal is the arterial blood pressure signal, the first preset frequency range may be 0.5 Hz to 3 Hz, and the second preset frequency range may be 0.05 Hz to 50 Hz.

When the second kurtosis and the dominant frequency are calculated, the highest vertical coordinate value in the PSD is determined as the second kurtosis, and the horizontal-axis frequency value corresponding to the highest vertical coordinate value is determined as the dominant frequency.

At step S103: perform signal quality assessment on the physiological signal based on the signal parameter values.

Because the signal parameter values include the first kurtosis, the skewness, the effective signal ratio, the second kurtosis and the dominant frequency, the first kurtosis and the skewness can serve as criteria for judging outliers in the physiological signal, the effective signal ratio can reflect, to some extent, the ratio of useful non-noise components relative to the total component in the physiological signal, the dominant frequency can reflect whether the physiological signal meets the signal quality standard, and the kurtosis can reflect noise distribution of the physiological signal, by integrating the above-mentioned signal parameter values that reflect the signal quality from different perspectives, a more accurate and comprehensive signal quality assessment on the physiological signal can be performed.

When the signal quality assessment is performed, in an embodiment of the present disclosure, a signal feature of the signal parameter values can be extracted, the signal feature is matched with each preset signal feature, and based on the degree of matching, a signal quality of the physiological signal is determined.

The above preset signal features are signal features corresponding to the physiological signal with preset signal qualities. For example, the signal quality is divided based on signal quality grades, and the predetermined signal quality includes excellent signal quality, qualified signal quality, and unqualified signal quality. The preset signal features include signal features corresponding to the physiological signal with the excellent signal quality, signal features corresponding to the physiological signal with the qualified signal quality, and signal features corresponding to the physiological signal with the unqualified signal quality.

During signal feature extraction, a feature extraction algorithm can be adopted to perform feature extraction on the signal parameter values.

During feature matching, the distance between the signal features and each preset signal feature can be calculated. The distance may be Euclidean distance, cosine distance, etc. When the calculated distance is shorter, it indicates a higher degree of matching between the two types of signal features. When the calculated distance is larger, it indicates a lower degree of matching between the two types of signal features. Based on this, the calculated distance can be determined as the degree of matching.

When the signal quality of the physiological signal is determined, the preset signal quality corresponding to the preset signal feature with the highest degree of matching can be determined as the signal quality of the physiological signal.

When the signal quality assessment is performed on the physiological signal, in an embodiment of the present disclosure, the signal parameter values may also be input into a pre-trained support vector machine model, thereby a signal quality assessment result output by the support vector machine model is obtained. The support vector machine model is a model obtained by training an initial neural network model with signal parameter values of sample physiological signals as training samples and actual signal quality results of the sample physiological signals as training standards, and the support vector machine model is configured to perform signal quality classification on the physiological signal.

For other implementations for assessing the signal quality of the physiological signal, reference may be made to the following embodiments, and detailed descriptions are omitted herein.

At step S104: in response to a signal quality assessment result represents that a signal quality of the physiological signal satisfies a preset signal quality requirement, implement intra-aortic balloon counterpulsation based on the physiological signal.

The preset signal quality requirement may be preset. When the signal quality of the physiological signal satisfies the preset signal quality requirement, it indicates the good signal quality of the physiological signal, and in response to a signal quality assessment result represents that the signal quality of the physiological signal satisfies preset signal quality requirement, the intra-aortic balloon counterpulsation can be implemented by adopting the above physiological signal. When the signal quality of the physiological signal does not satisfy the preset signal quality requirement, it indicates the poor signal quality of the physiological signal, and in response to a signal quality assessment result represents that the signal quality of the physiological signal does not satisfy preset signal quality requirement, the process can be terminated or an alarm can be given.

When the intra-aortic balloon counterpulsation is implemented based on the physiological signal, the diastolic time and the systolic time can be determined based on the physiological signal, and balloon inflation and deflation can be performed before the diastolic time and the systolic time.

In response to the physiological signal include the electrocardiographic signal and the arterial blood pressure signal, it is possible that the signal quality of the electrocardiographic signal and the arterial blood pressure signal satisfies the preset signal quality requirement. In this case, in an embodiment of the present disclosure, target physiological signal can be selected based on the priority corresponding to the electrocardiographic signal and the arterial blood pressure signal; and the intra-aortic balloon counterpulsation is performed based on the target physiological signal.

For example, in response to the priority corresponding to the preset electrocardiographic signal being higher than the priority corresponding to the arterial blood pressure signal, the electrocardiographic signal can be determined as the target physiological signal, and based on the electrocardiographic signal, the intra-aortic balloon counterpulsation is implemented. That is, the diastolic time and the systolic time are determined based on the electrocardiographic signal, and balloon inflation and deflation are performed before the diastolic time and the systolic time.

From the above, it can be seen that when the method provided by this embodiment is applied to quality assessment on the physiological signal, because the signal parameter values include the first kurtosis, the skewness, the effective signal ratio, the second kurtosis, and the dominant frequency, the first kurtosis and the skewness can serve as criteria for judging outliers in the physiological signal, the effective signal ratio can reflect, to some extent, the ratio of useful non-noise components relative to the total component in the physiological signal, the dominant frequency can reflect whether the physiological signal meet the signal quality standard, and the kurtosis can reflect noise distribution of the physiological signal, by integrating the above-mentioned parameter values and considering signal quality information represented by the signal parameter values, a more accurate and comprehensive signal quality assessment on the physiological signal can be performed.

In the step S103 of the embodiment corresponding to FIG. 1, in addition to using the mentioned method for signal quality assessment, signal quality assessment may also be performed according to the following two different implementations.

The first implementation is implemented according to the following steps A1 to A3.

At step A1: extract signal features of signal parameter values.

During signal feature extraction, the feature extraction algorithm can be adopted to perform feature extraction on the signal parameter values.

At step A2: perform feature fusion on the extracted signal feature to obtain a target feature.

In an implementation, the extracted signal feature can be spliced, and feature obtained after splicing are determined as the target feature.

At step A3: perform signal quality classification on the physiological signal based on the target feature to obtain a signal quality assessment result.

The target feature is obtained by performing the feature fusion on the extracted signal feature, combine information reflected by the signal feature, and represent deeper-level signal quality information, and therefore, accurate signal quality classification can be performed on the physiological signal based on the target feature.

When the signal quality classification is performed, in an embodiment of the present disclosure, the target feature may be input into a pre-trained support vector machine model to obtain a signal quality classification result output by the support vector machine model, which serves as the signal quality assessment result.

The support vector machine model is a model obtained by training, by adopting a support vector machine algorithm and a Gaussian radial basis function, an initial support vector machine model with signal parameter values of sample physiological signals as training samples and actual signal quality results of the sample physiological signals as training standards, and is used for performing signal quality classification on the physiological signal. Because the support vector machine model is obtained after training through a large number of training samples, the support vector machine model can learn rules for signal quality classification based on the signal parameter values. Therefore, by inputting the signal parameter values into the support vector machine model, more accurate signal quality can be obtained.

From the above, it can be seen that the target feature is obtained by performing the feature fusion on the extracted signal feature, combine information reflected by the signal feature, and represent deeper-level signal quality information, and therefore, more accurate signal quality classification can be performed on the physiological signal based on the target feature.

In this case, when the physiological signal is the electrocardiographic signal, the signal parameter values may further include: the number of R waves in the electrocardiographic signal and a dispersion of RR intervals.

The dispersion of RR intervals represents the dispersion of the time intervals between two adjacent R waves in the electrocardiographic signal.

The effective signal ratio in the signal parameter values may be further divided into a first-category effective signal ratio and a second-category effective signal ratio.

The number of R waves can be obtained by using an R-wave detection algorithm to detect the electrocardiographic signal.

The dispersion D of RR intervals may be calculated according to the following expression:

$$D = \frac{\sum_{i=1}^{N-1}(RR_i - RR_{ave})}{N-1}$$

Wherein N denotes the number of R waves, $RR_i$ denotes the time interval between every two adjacent R waves, and $RR_{ave}$ denotes a mean value of the time intervals of the two adjacent R waves in the electrocardiographic signal.

Preset frequency ranges corresponding to the first-category effective signal ratio and the second-category effective signal ratio are different. In an embodiment, a first preset frequency range of the first-category effective signal ratio may be 0.5 Hz to 15 Hz, and a second preset frequency range may be 0.05 Hz to 50 Hz. A first preset frequency range of the second-category effective signal ratio may be 5 Hz to 15 Hz, and a second preset frequency range may be 5 Hz to 45 Hz.

The second implementation is implemented according to the following steps B1 to B2.

At step B1: judge whether the dominant frequency is within a preset dominant frequency range, and in response to the dominant frequency being within the preset dominant frequency range, perform step B2.

The preset dominant frequency range is a normal dominant frequency range corresponding to the signal type of the physiological signal. The preset dominant frequency range may be pre-determined based on the medical technical knowledge. For example, for the electrocardiographic signal, the dominant frequency may fluctuate within a relatively large range of 0.5 Hz to 10 Hz, and based on this, the normal dominant frequency range corresponding to the electrocardiographic signal is defined as [0.5, 10] Hz. For the arterial blood pressure signal obtained after high-intensity filtering, theoretically, the most prominent frequency component is the pulsatile rhythm consistent with the heart rate, and therefore, the normal dominant frequency range corresponding to the arterial blood pressure signal is defined as [0.5, 4] Hz.

When the dominant frequency is within the preset dominant frequency range, it indicates that the signal quality of the physiological signal is normal from the perspective of the dominant frequency, and in this case, further analysis is performed on the signal quality based on other signal parameter values. When the dominant frequency is not within the preset dominant frequency range, the signal quality of the physiological signal is abnormal from the perspective of the dominant frequency, and in this case, the process is terminated, and an alarm about the abnormal quality of the physiological signal is sent to related medical personnel.

Because the dominant frequency reflects the most prominent frequency component in the physiological signal, the physiological signal with a low noise level has a limited number of important frequency components, that is, the dominant frequency is prominent. For physiological signal with obvious artifacts, artifact components will bring about associated artifact frequency components, changing the shape of the frequency distribution. Therefore, compared with other signal parameter values, the signal quality of the physiological signal can be more significantly judged based on the dominant frequency. Therefore, the signal quality analysis is first performed based on the dominant frequency. In response to the dominant frequency being within the preset dominant frequency range, continue to adopt other signal parameter values to perform the signal quality analysis, thereby further accurately analyzing the signal quality; and in response to the dominant frequency not being within the preset dominant frequency range, the process is terminated directly, thereby improving the efficiency of signal quality analysis.

At step B2: determine the target quantity of signal parameter values, within corresponding preset target signal parameter ranges, from the target signal parameter values, and perform signal quality assessment on the physiological signal based on the target quantity.

The target signal parameter values include the first kurtosis, the skewness, the effective signal ratio, and the second kurtosis.

The preset target signal parameter ranges are normal signal parameter value ranges corresponding to the signal type of the physiological signal. When the signal parameter values are within the preset target signal parameter ranges, it indicates that the signal quality represented by the signal parameter value is normal. When the signal parameter values are not within the preset target signal parameter ranges, it indicates that the signal quality represented by the signal parameter value is abnormal.

The above preset target signal parameter range may be pre-determined based on medical technological knowledge.

For the first kurtosis and the skewness, the first kurtosis and the skewness can be used as criteria for judging outliers in the signal. The distribution of signals without outliers is more symmetric, and there will be a sharp peak. The physiological signal with the good signal quality has a high K value and a high S value, and based on this, the target signal parameter range corresponding to the first kurtosis and the skewness can be set higher than a preset threshold. For example, the target signal parameter range corresponding to the first kurtosis of the electrocardiographic signal is determined to be greater than or equal to 5. The target signal parameter range corresponding to the first kurtosis of the arterial pressure signal is determined to be greater than or equal to 2. The target signal parameter range corresponding to the skewness of the electrocardiographic signal is determined to be greater than or equal to 1. The target signal parameter range corresponding to the skewness of the arterial pressure signals is determined to be greater than or equal to 1.

For the effective signal ratio, when the physiological signal is the electrocardiographic signal, the frequency range of the electrocardiographic signal is typically 0 Hz to 100 Hz, which includes low-frequency baseline drift noise (0 Hz to 0.25 Hz), low-frequency components of the electrocardiographic signal (0.25 Hz to 10 Hz), high-frequency components of the electrocardiographic signal (10 Hz to 20 Hz), and medium-high-frequency noise (20 Hz to 100 Hz). Based on a large number of relevant research findings, by comparing the spectral energy within the range of 0.5 Hz to 15 Hz with the spectral energy within the range of 0.05 Hz to 50 Hz, the ratio can reflect, to some extent, the ratio of useful non-noise components relative to the total component in that segment of the electrocardiographic signal. Generally, when the ratio is greater than 0.5, the signal quality of the electrocardiographic signal is considered normal. Therefore, the target signal parameter range corresponding to the effective signal ratio of the electrocardiographic signal can be determined to be greater than or equal to 0.5. Based on the same principle, the target signal parameter range corresponding to the effective signal ratio of the arterial pressure signal can be determined to be greater than or equal to 0.2.

For the second kurtosis, based on medical experiential knowledge, the target signal parameter range corresponding to the second-order kurtosis of the electrocardiographic signal is determined to be greater than or equal to 20, and the target signal parameter range corresponding to the second-order kurtosis of the arterial pressure signal is determined to be greater than or equal to 100.

When the target quantity is determined, signal parameter values within the preset target signal parameter ranges can be determined, and the number of the determined signal parameter values is adopted as the target quantity. For example, when the physiological signal is the electrocardiographic signal, the preset signal parameter value ranges corresponding to the electrocardiographic signal is respectively defined as $K>=5$, $S>=1$, $SDR>=0.5$, and $K_{PSD}>=20$, where K denotes the first kurtosis, S denotes the skewness, SDR denotes the effective signal ratio, and $K_{PSD}$ denotes the second kurtosis. The signal parameter values obtained after parameter value extraction on the current electrocardio signal are respectively $K=8$, $S=4$, $SDR=0.3$, and $K_{PSD}=25$. Because the first kurtosis, the skewness, and the second kurtosis are all within the preset signal parameter value ranges, the target quantity is 3.

The target quantity can reflect the number of the signal parameter values within the preset target signal parameter ranges, a higher target quantity indicates a larger number of signal parameter values representing the normal signal quality, a lower target quantity indicates a smaller number of signal parameter values representing the normal signal quality, and therefore, the target quantity can represent the signal quality of the physiological signal. Therefore, the signal quality of the physiological signal can be accurately assessed based on the target quantity.

When the signal quality assessment is performed based on the target quantity, in the first implementation, in response to the target quantity being greater than a preset quantity threshold, it indicates that a larger number of signal parameter values represent the normal signal quality, and in this case, it can be determined that the signal quality of the physiological signal is higher. In response to the target quantity being less than or equal to the preset quantity threshold, it indicates that a smaller number of signal parameter values represent the normal signal quality, and in this case, it can be determined that the signal quality of the physiological signal is lower.

In the second implementation, signal quality grades can be predetermined. For example, the signal quality can be classified into three grades: excellent, qualified, and unqualified, a quantity range corresponding to each signal quality grade is determined, and based on the quantity range corresponding to each signal quality grade, the target quantity range within which the target quantity falls can be determined from various preset quantity ranges, and the preset signal quality grade corresponding to the target quantity range is adopted as the signal quality assessment result for the physiological signal.

For example, it is predetermined that a first quantity range corresponding to the excellent quality grade of the physiological signal is greater than or equal to 3, a second quantity range corresponding to the qualified quality grade of the physiological signal is equal to 2, and a third quantity range corresponding to the unqualified quality grade of the physiological signal is less than 2, and in this case, in response to the target quantity being 3, because 3 belongs to the first quantity range, it can be determined that the signal quality of the current physiological signal is excellent.

The signal quality of the physiological signal can be more significantly judged based on the dominant frequency compared to other signal parameter values. Therefore, the signal quality analysis is first performed based on the dominant frequency. In response to the dominant frequency being within the preset dominant frequency range, continue to adopt other signal parameter values to perform the signal quality analysis, thereby further accurately analyzing the signal quality; and in response to the dominant frequency not being within the preset dominant frequency range, the process is terminated directly, thereby improving the efficiency of signal quality analysis.

In addition, the target quantity can reflect the number of the signal parameter values within the preset target signal parameter ranges, a higher target quantity indicates a larger number of signal parameter values representing the normal signal quality, a lower target quantity indicates a smaller number of signal parameter values representing the normal signal quality, and therefore, the target quantity can comprehensively represent the signal quality of the physiological signal. Therefore, the signal quality of the physiological signal can be accurately assessed based on the target quantity.

In an embodiment of the present disclosure, taking the physiological signal being the arterial blood pressure signal as an example, FIGS. 2a to 2h and Table 1 show experimental verification data to validate the effect of signal quality assessment using the solution provided in this embodiment.

Figure 2A:
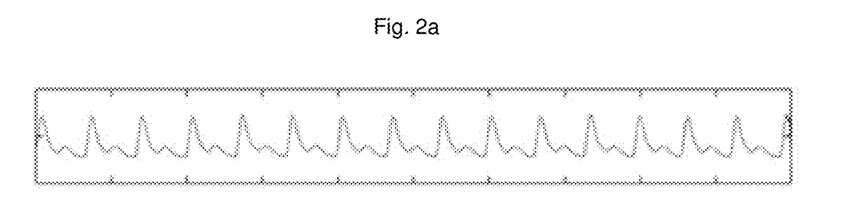
FIG. 2a is an original arterial blood pressure signal according to an embodiment of the present disclosure.
Figure 2B:
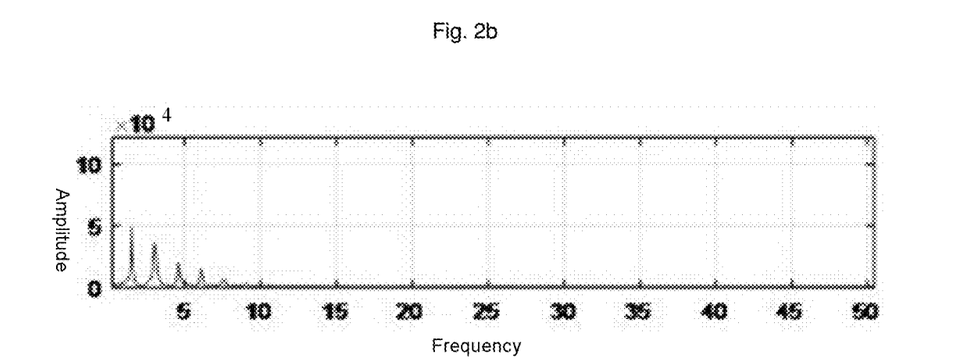
FIG. 2b is a diagram of frequency spectrum distribution of the original arterial blood pressure signal according to an embodiment of the present disclosure.
Figure 2C:
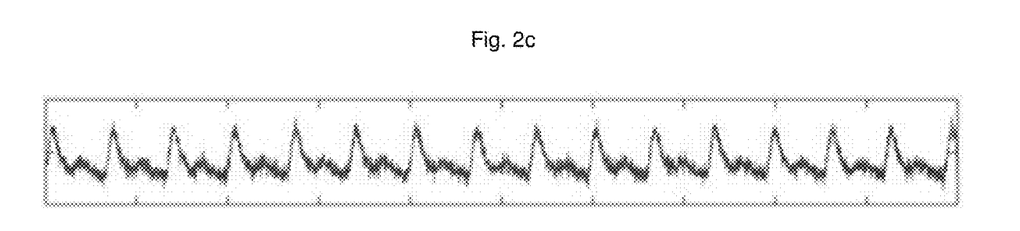
FIG. 2c is an arterial blood pressure signal mildly contaminated by noise according to an embodiment of the present disclosure.
Figure 2D:
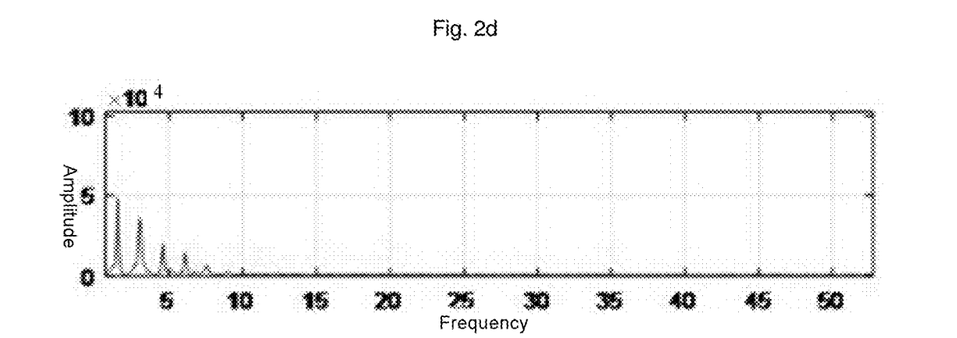
FIG. 2d is a diagram of frequency spectrum distribution of an arterial blood pressure signal according to an embodiment of the present disclosure.
Figure 2E:
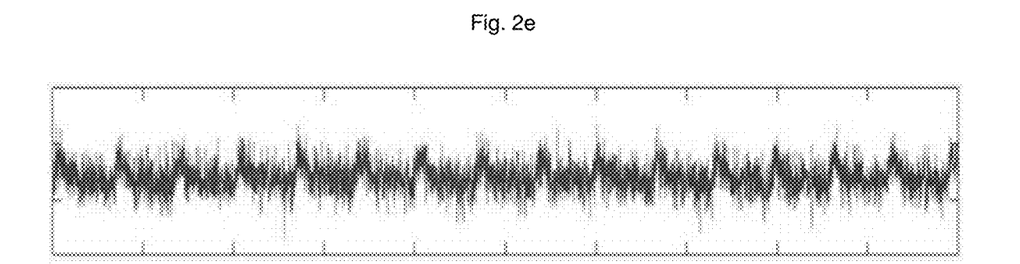
FIG. 2e is an arterial blood pressure signal moderately contaminated by noise according to an embodiment of the present disclosure.
Figure 2F:
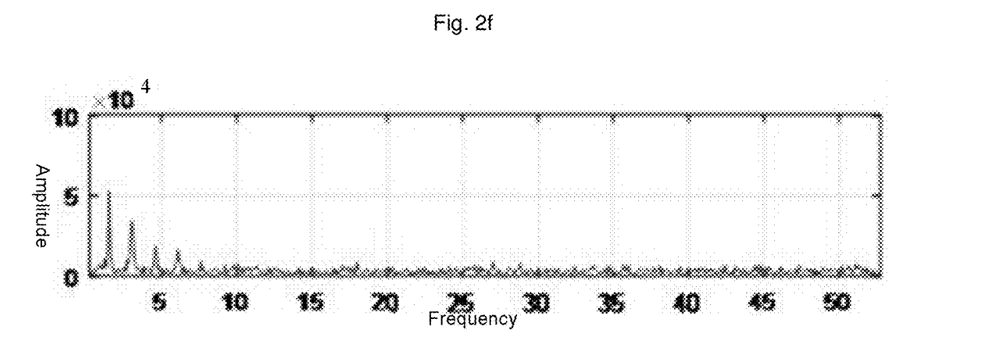
FIG. 2f is a diagram of frequency spectrum distribution of the arterial blood pressure signal moderately contaminated by noise according to an embodiment of the present disclosure.
Figure 2G:
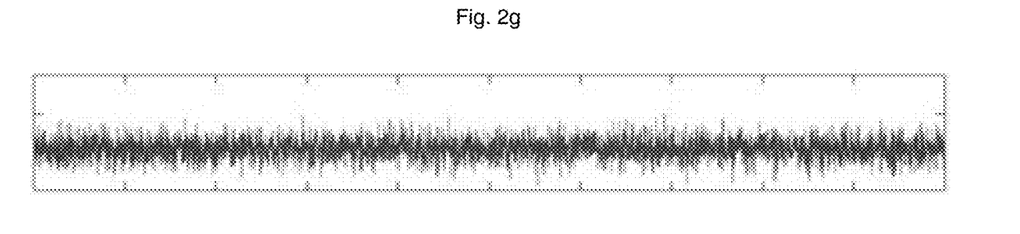
FIG. 2g is an arterial blood pressure signal heavily contaminated by noise according to an embodiment of the present disclosure.
Figure 2H:
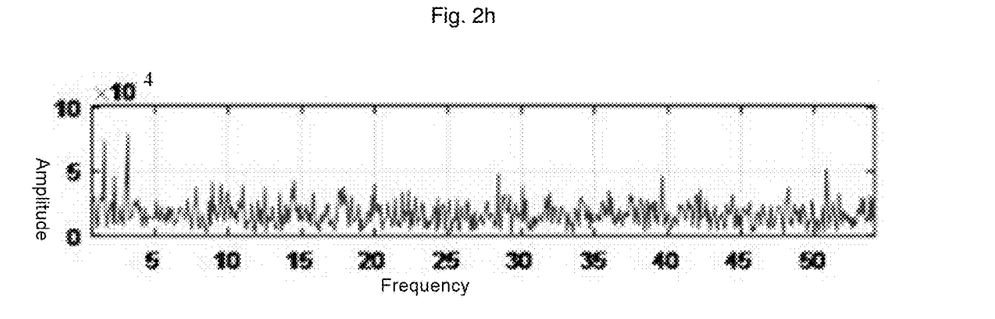
FIG. 2h is a diagram of frequency spectrum distribution of the arterial blood pressure signal heavily contaminated by noise according to an embodiment of the present disclosure.

FIG. 2a illustrates an original arterial blood pressure signal. FIG. 2b illustrates a diagram of frequency spectrum distribution of the original arterial blood pressure signal. FIG. 2c illustrates an arterial blood pressure signal mildly contaminated by noise. FIG. 2d illustrates a diagram of frequency spectrum distribution of the arterial blood pressure signal mildly contaminated by noise. FIG. 2e illustrates an arterial blood pressure signal moderately contaminated by noise. FIG. 2f illustrates a diagram of frequency spectrum distribution of the arterial blood pressure signal moderately contaminated by noise. FIG. 2g illustrates an arterial blood pressure signal heavily contaminated by noise. FIG. 2h illustrates a diagram of frequency spectrum distribution of the arterial blood pressure signal heavily contaminated by noise.

TABLE 1

| Quality index | Signal | | | | |
| --- | --- | --- | --- | --- | --- |
| | First kurtosis K | Skewness S | Dominant frequency $F_{ABP}$ (Hz) | Effective signal ratio SDR | Second kurtosis K |
| Original arterial blood pressure signal | 3.58 | 1.30 | 1.5 | 0.35 | 445 |
| Arterial blood pressure signal mildly contaminated by noise | 3.44 | 1.08 | 1.5 | 0.29 | 433 |
| Arterial blood pressure signal moderately contaminated by noise | 2.99 | 0.082 | 1.5 | 0.12 | 135 |

TABLE 1-continued

| Quality index | Signal | | | | |
| --- | --- | --- | --- | --- | --- |
| | First kurtosis K | Skewness S | Dominant frequency $F_{ABP}$ (Hz) | Effective signal ratio SDR | Second kurtosis K |
| Arterial blood pressure signal heavily contaminated by noise | 2.91 | −0.036 | 60.5 | 0.059 | 3.10 |

Preset signal parameter ranges corresponding to the signal parameter values of the arterial blood pressure signal are respectively K>=2, S>=1, the preset signal parameter range of $F_{ABP}$ being [0.5, 4] Hz, SDR>=0.2, and $K_{PSD}$>=100. Based on the signal quality analysis solution provided in this embodiment, the original arterial blood pressure signal and the arterial blood pressure signal mildly contaminated by noise are judged to have the excellent signal quality. By observing the signal, the locations of feature points can be accurately seen in the two segments of signals, which cannot affect the judgment on subsequent feature points and important parameters. The arterial blood pressure signal moderately contaminated by noise is judged to have the qualified signal quality. By observation, the signal trend can be faintly discerned, approximate locations of feature points can be identified as well, and therefore, the arterial blood pressure signal can be judged as the qualified signal. For the arterial blood pressure signal heavily contaminated by noise, it is basically difficult to discern the trend of the signal and the locations of feature points, and therefore, it is reasonable to judge the arterial blood pressure signal having the unqualified signal quality.

Corresponding to the above IABP-based physiological signal quality assessment method, this embodiment of the present disclosure further provides an apparatus for assessing a physiological signal quality based on an Intra-Aortic Balloon counterPulsation (IABP) device.

Figure 3:
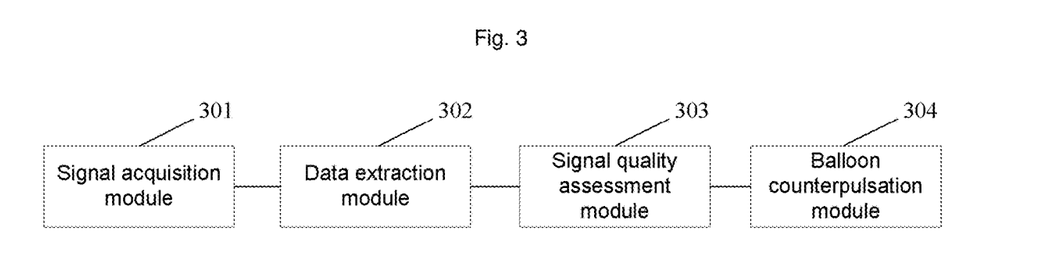
FIG. 3 is a schematic structural diagram of an apparatus for assessing a physiological signal quality based on an IABP device.

Referring to FIG. 3, FIG. 3 is a schematic structural diagram of an apparatus for assessing a physiological signal quality based on an IABP device. The apparatus includes following modules 301 to 304.

A signal acquisition module 301 is configured to acquire, in an operation process of the IABP device, physiological signal of a patient treated by the IABP device, where the physiological signal include an electrocardiographic signal and/or an arterial blood pressure signal.

A data extraction module 302 is configured to extract signal parameter values of the physiological signal, where the signal parameter values include a first kurtosis, a skewness, an effective signal ratio, a second kurtosis, and a dominant frequency. The first kurtosis represents a steepness or a flatness of physiological signal in a time domain distribution. The skewness represents a direction and a degree of deflection of the physiological signal in the time domain distribution. The effective signal ratio represents the ratio of an effective component in the physiological signal relative to a total component. The second kurtosis represents a steepness or a flatness of physiological signal in a frequency domain distribution. The dominant frequency represents a frequency corresponding to the second kurtosis of the physiological signal in the frequency domain distribution.

A signal quality assessment module 303 is configured to perform signal quality assessment on the physiological signal based on the signal parameter values.

A balloon counterpulsation module 304 is configured to implement, based on the physiological signal, intra-aortic balloon counterpulsation in response to the signal quality assessment result represents that the signal quality of the physiological signal satisfies a preset signal quality requirement.

From the above, it can be seen that when the method provided by this embodiment is applied to quality assessment on the physiological signal, because the signal parameter values include the first kurtosis, the skewness, the effective signal ratio, the second kurtosis, and the dominant frequency, the first-order kurtosis and the skewness can serve as criteria for judging outliers in the physiological signal, the effective signal ratio can reflect, to some extent, the ratio of useful non-noise components relative to the total component in the physiological signal, the dominant frequency can reflect whether the physiological signal meet the signal quality standard, and the kurtosis can reflect noise distribution of the physiological signal, by integrating the above-mentioned parameter values and considering signal quality information represented by the signal parameter values, a more accurate and comprehensive signal quality assessment on the physiological signal can be performed.

In an embodiment of the present disclosure, the signal quality assessment module 303 includes:
  a feature extraction sub-module is configured to extract a signal feature of the signal parameter values;
  a feature fusion sub-module is configured to perform feature fusion on the extracted signal feature to obtain a target feature;
  a first signal quality assessment sub-module is configured to perform signal quality classification on the physiological signal based on the target feature to obtain a signal quality assessment result.

From the above, it can be seen that the target feature is obtained by performing the feature fusion on the extracted signal feature, combine information reflected by the signal feature, and represent deeper-level signal quality information, and therefore, accurate signal quality classification can be performed on the physiological signal based on the target feature.

In an embodiment of the present disclosure, the first signal quality assessment sub-module is configured to input the target feature into a pre-trained support vector machine model to obtain a signal quality classification result output by the support vector machine model, which serves as the signal quality assessment result, where the support vector machine model is a model obtained by training, by adopting a support vector machine algorithm and a Gaussian radial basis function, an initial support vector machine model with signal parameter values of sample physiological signals as training samples and actual signal quality results of the sample physiological signals as training standards, and the support vector machine model is configured to perform signal quality classification on the physiological signal.

Because the support vector machine model is obtained after training through a large number of training samples, the support vector machine model can learn rules for signal quality classification based on the signal parameter values. Therefore, by inputting the signal parameter values into the support vector machine model, more accurate signal quality can be obtained.

In an embodiment of the present disclosure, when the physiological signal is the electrocardiographic signal, the signal parameter values further include: the number of R waves in the electrocardiographic signal and a dispersion of RR intervals. The dispersion of RR intervals represents the dispersion of a time intervals between two adjacent R waves in the electrocardiographic signal. The effective signal ratio includes a first-category effective signal ratio and a second-category effective signal ratio.

In an embodiment of the present disclosure, the signal quality assessment module 303 includes:

an information judgment sub-module is configured to judge whether the dominant frequency is within a preset dominant frequency range, and in response to the dominant frequency being within a preset dominant frequency range, trigger a second signal quality assessment sub-module, where the preset dominant frequency range is a normal dominant frequency range corresponding to the signal type of the physiological signal;

the second signal quality assessment sub-module is configured to determine the target quantity of signal parameter values, within corresponding preset target signal parameter ranges, from target signal parameter values, and perform signal quality assessment on the physiological signal based on the target quantity, where the target signal parameter values include the first kurtosis, the skewness, the effective signal ratio, and the second kurtosis; and the preset target signal parameter ranges are normal signal parameter value ranges corresponding to the signal type of the physiological signal.

The signal quality of the physiological signal can be more significantly judged based on the dominant frequency compared to other signal parameter values. Therefore, the signal quality analysis is first performed based on the dominant frequency. In response to the dominant frequency being within the preset dominant frequency range, continue to adopt other signal parameter values to perform the signal quality analysis, thereby further accurately analyzing the signal quality; and in response to the dominant frequency not being within the preset dominant frequency range, the process is terminated directly, thereby improving the efficiency of signal quality analysis.

In an embodiment of the present disclosure, the second signal quality assessment sub-module is configured to determine, from various preset quantity ranges, a target quantity range within which the target quantity falls, wherein the various preset quantity ranges correspond to preset signal quality grades, and a preset signal quality grade corresponding to the target quantity range is adopted as a signal quality assessment result for the physiological signal.

Corresponding to the above method for assessing a physiological signal quality based on an IIABP device, this embodiment of the present disclosure further provides an electronic device.

Figure 4:
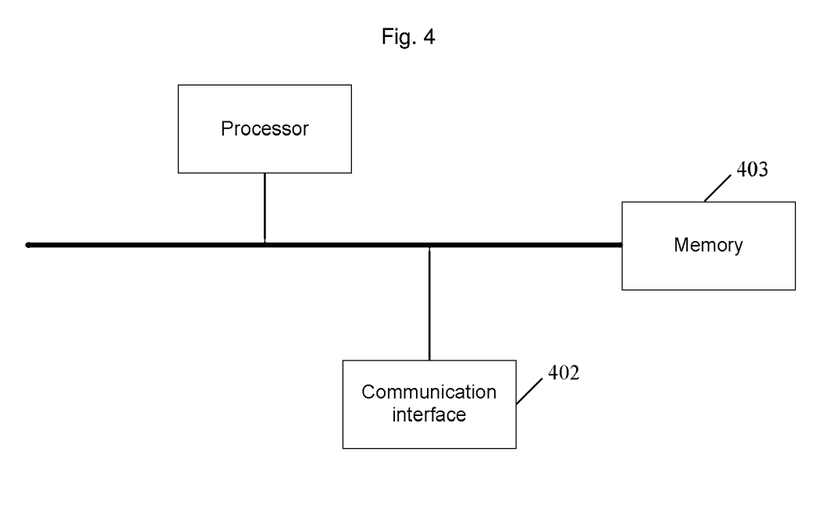
FIG. 4 is a schematic structural diagram of an electronic device according to an embodiment of the present disclosure.

Referring to FIG. 4, FIG. 4 is a schematic structural diagram of an electronic device according to an embodiment of the present disclosure. The electronic device includes a processor 401, a communication interface 402, a memory 403, and a communication bus 404, where the processor 401, the communication interface 402, and the memory 403 are in communication through the communication bus 404.

The memory 403 is configured to store a computer program.

The processor 401 is configured to implement, when executing the program stored on the memory 403, the IABP-based physiological signal quality assessment method provided in this embodiment of the present disclosure.

The communication bus mentioned in the electronic device may be a peripheral component interconnect (PCI) bus or an extended industry standard architecture (EISA) bus, etc. The communication bus may be divided into an address bus, a data bus, a control bus, and etc. For the sake of representation, only one bold line is used in the diagram for representation, but it does not imply that there is only one bus or one type of bus.

The communication interface is used for communication between the electronic device and another device.

The memory may include a random access memory (RAM), and may also include a non-volatile memory (NVM), such as at least one disk memory. Optionally, the memory may also be at least one storage apparatus located away from the processor.

The processor may be a general-purpose processor, including a central processing unit (CPU), a network processor (NP), etc.; and the processor may also be a digital signal processor (DSP), an application specific integrated circuit (ASIC), a field-programmable gate array (FPGA), or other programmable logic devices, discrete gates or transistor logic devices, and discrete hardware components.

In another embodiment of the present disclosure, a computer-readable storage medium is further provided. The computer-readable storage medium stores a computer program. The computer program, when executed by a processor, the method for assessing a physiological signal quality based on the IABP device provided in this embodiment of the present disclosure.

In another embodiment of the present disclosure, a computer program product including instructions is further provided. The instructions, when running on a computer, make the computer implement the method for assessing a physiological signal quality based on the IABP device provided in this embodiment of the present disclosure.

From the above, it can be seen that when the solution provided by this embodiment is applied to quality assessment on the physiological signal, because the signal parameter values include the first kurtosis, the skewness, the effective signal ratio, the second kurtosis, and the dominant frequency, the first kurtosis and the skewness can serve as criteria for judging outliers in the physiological signal, the effective signal ratio can reflect, to some extent, the ratio of useful non-noise components relative to the total component in the physiological signal, the dominant frequency can reflect whether the physiological signal meet the signal quality standard, and the kurtosis can reflect noise distribution of the physiological signal, by integrating the above-mentioned parameter values and considering signal quality information represented by the signal parameter values, a more accurate and comprehensive signal quality assessment on the physiological signal can be performed.

The above embodiments can be fully or partially implemented through software, hardware, firmware, or any combination thereof. When the software is adopted, the above embodiments can be fully or partially implemented in the form of the computer program product. The computer program product includes at least one computer instruction. When the computer program instructions are loaded and executed on the computer, the processes or functions described in the embodiments of the present disclosure are fully or partially generated. The computer may be a general-purpose computer, a special-purpose computer, a computer network, or another programmable device. The computer instructions may be stored in the computer-readable storage medium or transmitted from one computer-readable storage medium to another computer-readable storage medium. For example, the computer instructions may be transmitted from a website, a computer, a server, or a data center to another website, computer, server, or data center in a wired (e.g., a coaxial cable, an optical fiber, a digital subscriber line (DSL)) or wireless (e.g., infrared, wireless, and microwave) manner. The computer-readable storage medium may be any available medium accessible by the computer or may be a server, a data center, and another data storage device integrating one or more available media. The available medium may be a magnetic medium (e.g., a floppy disk, a hard drive, and a magnetic tape), an optical medium (e.g., DVD), or a semiconductor medium (e.g., a solid state disk (SSD)), etc.

It is to be noted that in this specification, relation terms such as first and second are used only to distinguish one entity or operation from another, and do not necessarily require or imply any actual relationship or order between these entities or operations. In addition, terms "comprise", "include" or any other variations thereof are intended to cover non-exclusive inclusion, and therefore a process, a method, an object or a device including a series of elements not only includes those elements but also includes other elements not clearly listed, or further includes inherent elements for the process, the method, the object or the device. In the absence of further restrictions, the element specified by the phrase "including a . . . " does not exclude the existence of other identical elements in the process, method, product, or device that includes the element.

The various embodiments in this specification are all described in a correlation manner, and mutual reference may be made for the same or similar parts among the embodiments. Each embodiment emphasizes the differences from the other embodiments. In particular, the embodiments related to the device, the electronic device, and the computer-readable storage medium are basically similar to method embodiments, such that the description is relatively simple. For relevant aspects, reference may be made to part of the descriptions of the embodiments of the method.

The foregoing descriptions are merely preferred embodiments of the present disclosure and are not intended to limit the scope of protection of the present disclosure. Any modification, equivalent replacement, improvement, etc., made within the spirit and principle of the present disclosure shall fall within the scope of protection of the present disclosure.

What is claimed is:

1. A method for assessing a physiological signal quality based on an Intra-Aortic Balloon counterPulsation (IABP) device, comprising:
   acquiring, in an operation process of the IABP device, a physiological signal of a patient treated by the IABP device, wherein the physiological signal comprises an electrocardiographic signal and/or an arterial blood pressure signal;
   extracting signal parameter values of the physiological signal;
   wherein the signal parameter values comprise: a first kurtosis, a skewness, an effective signal ratio, a second kurtosis, and a dominant frequency, the first kurtosis represents a steepness or a flatness of the physiological signal in a time domain distribution, the skewness represents a direction and a degree of deflection of the physiological signal in the time domain distribution, the effective signal ratio represents a ratio of an effective component relative to a total component in the physiological signal, the second kurtosis represents a steepness or a flatness of the physiological signal in a frequency domain distribution, and the dominant frequency represents a frequency corresponding to the second kurtosis of the physiological signal in the frequency domain distribution;
   performing signal quality assessment on the physiological signal based on the signal parameter values;
   in response to a signal quality assessment result represents that a signal quality of the physiological signal satisfies a preset signal quality requirement, implementing intra-aortic balloon counterpulsation based on the physiological signal.

2. The method as claimed in claim 1, wherein performing signal quality assessment on the physiological signal based on the signal parameter value comprises:
   extracting a signal feature of the signal parameter values;
   performing feature fusion on the extracted signal feature to obtain a target feature;
   performing signal quality classification on the physiological signal based on the target feature to obtain the signal quality assessment result.

3. The method as claimed in claim 2, wherein performing signal quality classification on the physiological signal based on the target feature comprises:
   inputting the target feature into a pre-trained support vector machine model to obtain a signal quality classification result output by the support vector machine model, which serves as the signal quality assessment result, wherein the support vector machine model is a model obtained by training, by adopting a support vector machine algorithm and a Gaussian radial basis function, an initial support vector machine model with signal parameter values of sample physiological signals as training samples and actual signal quality results of the sample physiological signals as training standards, and the support vector machine model is configured to perform signal quality classification on the physiological signal.

4. The method as claimed in claim 3, wherein when the physiological signal is electrocardiographic signal, the signal parameter values further comprise: the number of R waves in the electrocardiographic signal and the dispersion of RR intervals, the dispersion of RR intervals represents the dispersion of the time intervals between two adjacent R waves in the electrocardiographic signal, and the effective signal ratio comprises a first-category effective signal ratio and a second-category effective signal ratio.

5. The method as claimed in claim 2, wherein when the physiological signal is an electrocardiographic signal, the signal parameter value further comprises: the number of R waves in the electrocardiographic signal and a dispersion of RR intervals, the dispersion of RR intervals represents a dispersion of time intervals between two adjacent R waves in the electrocardiographic signal, and the effective signal ratio comprises a first-category effective signal ratio and a second-category effective signal ratio.

6. The method as claimed in claim 1, wherein performing signal quality assessment on the physiological signal based on the signal parameter value comprises:
   judging whether the dominant frequency is within a preset dominant frequency range, wherein the preset dominant frequency range is a normal dominant frequency range corresponding to a signal type of the physiological signal;
   in response to the dominant frequency being within the preset dominant frequency range, determining a target quantity of signal parameter values, within corresponding preset target signal parameter ranges, from target signal parameter values, and performing signal quality assessment on the physiological signal based on the target quantity, wherein the target signal parameter values comprise the first kurtosis, the skewness, the effective signal ratio, and the second kurtosis, and the preset target signal parameter ranges are normal signal parameter value ranges corresponding to a signal type of the physiological signal.

7. The method as claimed in claim 6, wherein performing signal quality assessment on the physiological signal based on the target quantity comprises:
determining, from various preset quantity ranges, a target quantity range within which the target quantity falls, wherein the various preset quantity ranges correspond to preset signal quality grades;
adopting a preset signal quality grade corresponding to the target quantity range as the signal quality assessment result for the physiological signal.

8. The method as claimed in claim 1, wherein acquiring, in the operation process of the IABP device, the physiological signal of the patient treated by the IABP device comprises:
acquiring a signal sampling rate;
acquiring the physiological signal of the patient treated by the IABP device based on the signal sampling rate.

9. The method as claimed in claim 1, wherein extracting the signal parameter values of the physiological signal comprises:
calculating the first kurtosis and the skewness based on a length of the physiological signal, a signal value of the physiological signal, a mean value of the physiological signal and a variance of the physiological signal;
performing fast Fourier transform (FFT) on the physiological signal to obtain power spectral density (PSD) of the physiological signal;
obtaining the effective signal ratio, the second kurtosis, and the dominant frequency based on the power spectral density.

10. The method as claimed in claim 1, wherein performing signal quality assessment on the physiological signal based on the signal parameter values comprises:
extracting a signal feature of the signal parameter values;
obtaining a matching degree by matching signal features corresponding to the physiological signal with a preset signal quality with the signal feature of the signal parameter values;
obtaining the signal quality assessment result based on the matching degree.

11. The method as claimed in claim 1, wherein obtaining the matching degree by matching signal features corresponding to the physiological signal with the preset signal quality with the signal feature of the signal parameter values comprises:
calculating a distance between the signal feature of the signal parameter values and the signal features corresponding to the physiological signal with the preset signal quality;
obtaining the matching degree based on the distance.

12. An apparatus for assessing a physiological signal quality based on an Intra-Aortic Balloon counterPulsation (IABP) device, comprising:
a signal acquisition module, configured to acquire, in an operation process of the IABP device, physiological signal of a patient treated by the IABP device, wherein the physiological signal comprises an electrocardiographic signal and/or an arterial blood pressure signal;
a data extraction module, configured to extract signal parameter values of the physiological signal, wherein the signal parameter values comprise a first kurtosis, a skewness, an effective signal ratio, a second kurtosis, and a dominant frequency, the first kurtosis represents a steepness or a flatness of the physiological signal in a time domain distribution, the skewness represents a direction and a degree of deflection of the physiological signal in the time domain distribution, the effective signal ratio represents a ratio of an effective component relative to a total component in the physiological signal, the second kurtosis represents a steepness or a flatness of the physiological signal in a frequency domain distribution, and the dominant frequency represents a frequency corresponding to the second kurtosis of the physiological signal in the frequency domain distribution;
a signal quality assessment module, configured to perform signal quality assessment on the physiological signal based on the signal parameter values;
a balloon counterpulsation module, configured to implement, based on the physiological signal, intra-aortic balloon counterpulsation in response to a signal quality assessment result represents that a signal quality of the physiological signal satisfies a preset signal quality requirement.

13. The apparatus as claimed in claim 12, wherein the signal quality assessment module comprises:
a feature extraction sub-module, configured to an extract signal feature of the signal parameter values;
a feature fusion sub-module, configured to perform feature fusion on the extracted signal feature to obtain a target feature;
a first signal quality assessment sub-module, configured to perform signal quality classification on the physiological signal based on the target feature to obtain the signal quality assessment result.

14. The apparatus as claimed in claim 13, wherein the first signal quality assessment sub-module is configured to input the target feature into a pre-trained support vector machine model to obtain a signal quality classification result output by the support vector machine model, which serves as the signal quality assessment result, wherein the support vector machine model is a model obtained by training, by adopting a support vector machine algorithm and a Gaussian radial basis function, an initial support vector machine model with signal parameter values of sample physiological signals as training samples and actual signal quality results of the sample physiological signals as training standards, and the support vector machine model is configured to perform signal quality classification on the physiological signal.

15. The apparatus as claimed in claim 14, wherein when the physiological signal is electrocardiographic signal, the signal parameter values further comprise: the number of R waves in the electrocardiographic signal and the dispersion of RR intervals, the dispersion of RR intervals represents the dispersion of the time intervals between two adjacent R waves in the electrocardiographic signal, and the effective signal ratio comprises a first-category effective signal ratio and a second-category effective signal ratio.

16. The apparatus as claimed in claim 13, wherein when the physiological signal is an electrocardiographic signal, the signal parameter values further comprise: the number of R waves in the electrocardiographic signal and a dispersion of RR intervals, the dispersion of RR intervals represents the dispersion of time intervals between two adjacent R waves in the electrocardiographic signal, and the effective signal ratio comprises a first-category effective signal ratio and a second-category effective signal ratio.

* * * * *